(12) United States Patent
Williams, II et al.

(10) Patent No.: US 7,055,887 B2
(45) Date of Patent: Jun. 6, 2006

(54) WATER AND SOUND SHIELD HAVING RAISED SEALING RIB

(75) Inventors: Michael P Williams, II, Bloomfield Hills, MI (US); Michael C Restaino, Birmingham, MI (US); Andrew DeWolfe, Clawson, MI (US); Jeffrey R Masters, Troy, MI (US); George L Bellairs, Rogers City, MI (US)

(73) Assignee: Cadillac Products Automotive Company, Troy, MI (US)

( * ) Notice: Subject to any disclaimer, the term of this patent is extended or adjusted under 35 U.S.C. 154(b) by 0 days.

(21) Appl. No.: 10/786,906

(22) Filed: Feb. 25, 2004

(65) Prior Publication Data

US 2005/0184555 A1 Aug. 25, 2005

(51) Int. Cl.
*B60R 13/02* (2006.01)

(52) U.S. Cl. .............................. 296/146.7; 296/146.1; 296/39.1

(58) Field of Classification Search ............... 296/39.1, 296/39.3, 146.7, 146.1, 146.5
See application file for complete search history.

(56) References Cited

U.S. PATENT DOCUMENTS

| | | | |
|---|---|---|---|
| 5,322,722 A * | 6/1994 | Rozenberg ................. 428/40.1 |
| 5,409,779 A | 4/1995 | Puckett et al. |
| 5,456,513 A | 10/1995 | Schmidt |
| 5,652,415 A | 7/1997 | Pelzer et al. |
| 6,024,905 A | 2/2000 | Doris |
| 6,197,403 B1 | 3/2001 | Brown et al. |
| 6,226,927 B1 * | 5/2001 | Bertolini et al. .............. 49/502 |
| 6,412,852 B1 | 7/2002 | Koa et al. |
| 6,676,195 B1 | 1/2004 | Marriott et al. |
| 6,712,179 B1 * | 3/2004 | Bouyonnet .................. 181/290 |
| 6,767,049 B1 * | 7/2004 | Morrison et al. ........ 296/146.7 |
| 2001/0030444 A1 * | 10/2001 | Whitehead et al. ...... 296/146.7 |

FOREIGN PATENT DOCUMENTS

| | | |
|---|---|---|
| DE | 36 00 745 | 7/1986 |
| FR | 78 30463 | 6/1979 |

* cited by examiner

*Primary Examiner*—Joseph D. Pape
(74) *Attorney, Agent, or Firm*—Harness, Dickey & Pierce, P.L.C.

(57) ABSTRACT

A water and acoustic barrier positionable between a vehicle trim piece and a vehicle body member includes a sheet having a first layer formed of an interpolymer material and a second sheet layer formed of a polyethylene material. A raised rib is formed about at least a portion of a sheet perimeter. The raised rib having an adhesive bead forms a seal between the sheet and the vehicle body member. A raised form positioned adjacent the raised rib but oppositely oriented from the raised rib acts to substantially equalize a sealing pressure along the length of the raised rib. A plurality of apertures define fastener attachment points to connect the barrier to the vehicle trim piece.

20 Claims, 9 Drawing Sheets

WATER AND SOUND SHIELD HAVING RAISED SEALING RIB

FIELD OF THE INVENTION

The present invention relates in general to water, wind, air and sound barriers and more specifically to a composite shield positionable between a vehicle trim component and vehicle structure, and a method of manufacture.

BACKGROUND OF THE INVENTION

Automobile vehicles commonly provide acoustic barriers between vehicle body members and the interior trim components of the vehicle. In addition to acoustic attenuation, these barriers when used between a door member and a door trim member of an automobile vehicle also provide a seal for moisture and dirt to prevent moisture or dirt from entering into the mechanical component areas of the door structure. In door applications when the barrier is affixed to a door trim member prior to assembly to the door assembly, such barriers are known as trim integrated acoustic shields (TIAS). Barriers which are formed of interpolymer materials are used to increase an acoustic attenuation across the barrier. Interpolymer materials are defined herein as compositions of polymeric material having one or more inorganic filler materials.

An example of an interpolymeric material acoustic barrier is provided in U.S. Pat. No. 5,409,779 issued to Puckett et al. on Apr. 25, 1995, the disclosure of which is incorporated herein by reference. The barrier formed in the Puckett reference is cold-formed and is effective for applications requiring a generally flat barrier where the flexible pocket formed by the cold-forming process is operable to expand into and seal an interior cavity of a door panel.

Improvements to known acoustic barriers are required, for example, in applications where complex geometry components and a complex seal area are present between a door structure and an interior trim panel. The interpolymer materials currently used in these applications may not provide sufficient porosity control when fabricated in a thermoforming operation. Where thermoformed or permanently formed pockets are desirable, an improved perimeter seal is also desirable in addition to the adhesive bead seal commonly used.

SUMMARY OF THE INVENTION

In a preferred embodiment of the present invention, a moisture, air and acoustic barrier includes a barrier film having a first layer and a polymeric second layer. The first layer includes an interpolymer material. At least one rib defining a raised seal is positioned adjacent an outer perimeter of the film. At least one drawn form positioned adjacent the at least one rib is operable to maintain an approximately equal sealing force along the raised seal. The interpolymer material includes a density selectable to attenuate an acoustic energy through the film when the rib is in operable communication with a body member of a vehicle.

In another preferred embodiment, a barrier positionable between a vehicle trim piece and a vehicle body member includes a composite sheet having a plurality of apertures defining fastener attachment points operable to connect the barrier to the vehicle trim piece. A first sheet layer includes an interpolymer material. A second sheet layer includes a polyethylene material. A raised rib is formed about at least a portion of a perimeter of the composite sheet, operable to form a seal between the sheet and the vehicle body member. The barrier operably attenuates an acoustic energy between the vehicle trim piece and the vehicle body member.

In yet another preferred embodiment of the present invention, a method for forming an acoustic barrier, the barrier having an interpolymeric material and a polymeric material, comprises: creating a film using the interpolymeric material and the polymeric material having the interpolymeric material in a first layer and the polymeric material in a second layer of the film; forming a raised rib about at least a portion of a perimeter of the film; positioning a raised form adjacent at least a portion of the raised rib, the raised form oriented directionally opposite from the raised rib; and applying an adhesive bead to the raised rib.

In still another preferred embodiment of the present invention, a method is provided for forming an acoustic barrier positionable between component parts of an automobile vehicle. The method includes: co-extruding a film having an interpolymeric material layer and a polymeric layer; forming a raised rib extending away from a first side of the film and about at least a portion of a perimeter of the film; creating a form that extends away from a second side of the film and oppositely directed from the raised rib; applying an adhesive bead along an outer face of the raised rib; and positioning the form adjacent the raised rib such that a compressive force applied to the form acts to approximately equalize a sealing force about the raised rib.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
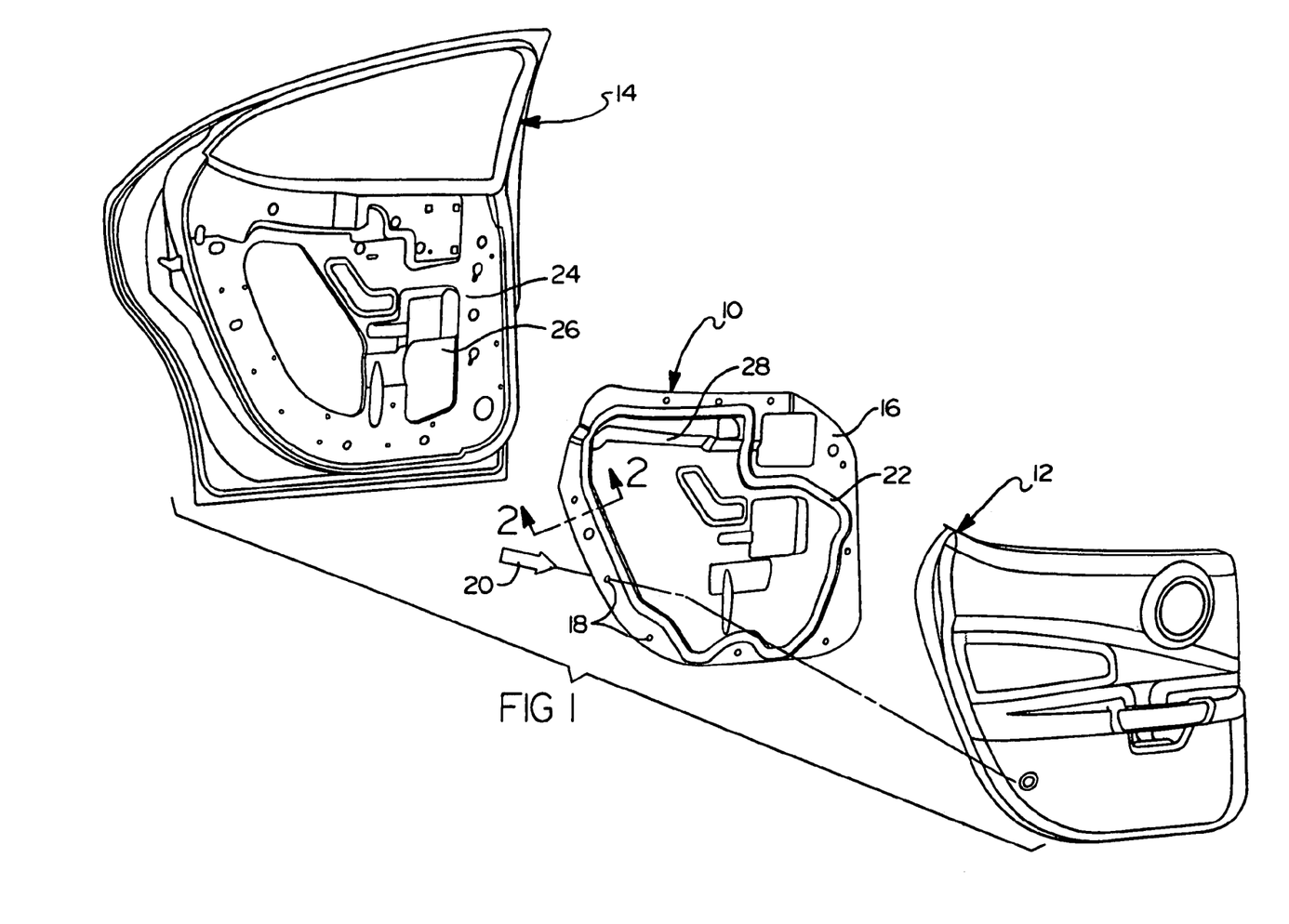
FIG. 1 is a perspective assembly view showing a sound shield of the present invention positioned between a trim panel and a door member according to one preferred embodiment of the present invention.

According to a preferred embodiment of the present invention and as shown in FIG. 1, a sound shield 10 is positionable between a trim panel 12 and a door member 14 of an automobile vehicle (not shown). Sound shield 10 includes a body 16 having a plurality of apertures 18 formed about a perimeter thereof. Body 16 is mounted to trim panel 12 using a plurality of fasteners 20 inserted in each aperture 18 to mate with a corresponding aperture (not shown) in trim panel 12. A raised rib 22, defining a sealing surface, is oriented or raised on body 16 in a direction toward door member 14. An adhesive bead (shown and described in reference to FIG. 2) is placed on raised rib 22 such that contact along the entire face of raised rib 22 with a sealing surface 24 of door member 14 acts to connect and seal sound shield 10 to door member 14. Sealing surface 24 of door member 14 generally surrounds a mechanical component area 26. Mechanical component area 26 generally includes items such as door locking mechanisms, electric window motors, and side view mirror control members. Apertures 18 are normally formed following formation of raised rib(s) 22 by a punching operation known in the art.

Raised rib 22 is intended to seal along its entire length to sealing surface 24. Complex geometry of trim panel 12, within mechanical component area 26, or outside of mechanical component area 26 of door member 14 can interfere with providing an even sealing pressure about raised rib 22. To equalize sealing pressure along the entire length of raised rib 22, one or more raised forms 28 are also provided on body 16. Raised forms 28 are generally formed on an opposing face of body 16 and are therefore generally oppositely oriented to raised ribs 22. Raised forms 28 function by contacting an adjacent surface of trim panel 12 such that trim panel 12 provides additional stiffness and mounting pressure against raised rib 22 adjacent to raised form 28 to equalize sealing pressure along raised rib 22.

Figure 2:
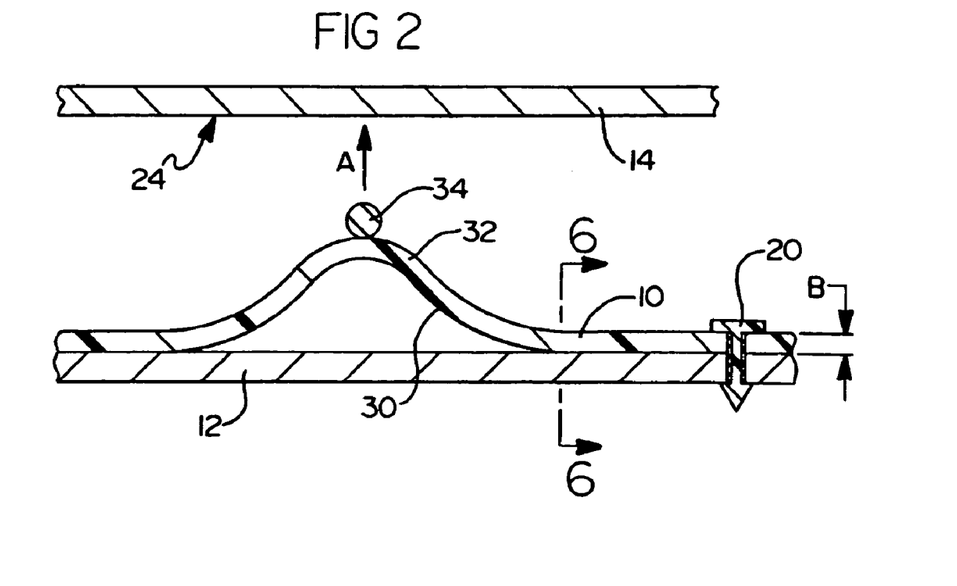
FIG. 2 is a partial cross-sectional view taken at Section 2—2 of FIG. 1.

Referring to FIG. 2, a raised rib 30 has a curved rib face 32 according to a preferred embodiment of the present invention. A sealing strip 34 is deposited along the entire curved rib face 32 along the convex-shaped surface. Following installation of sound shield 10 to trim panel 12, curved rib face 32 is brought into contact with sealing surface 24 of door member 14 such that sealing strip 34 contacts sealing surface 24 in the direction of installation arrow "A". Fasteners 20, known in the art, which are typically formed of polymeric materials and/or metallic materials are inserted to join sound shield 10 to trim panel 12. Fasteners 20 can also be designed to be removable either completely or in part such that trim panel 12 can subsequently be removed from sound shield 10 while sound shield 10 continues to adhere to sealing surface 24 via sealing strip 34. Sound shield 10 includes a shield thickness "B" which is shown and described in better detail in reference to FIGS. 6 and 7.

Figure 3:
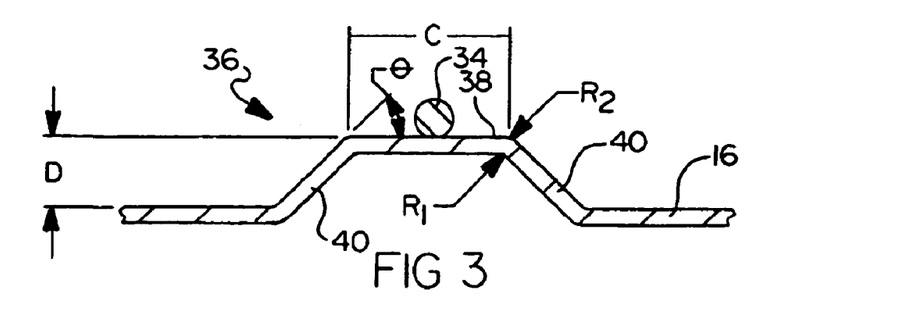
FIG. 3 is a partial cross-sectional view similar to FIG. 2 showing an alternate geometry for a raised rib of the present invention.

As best seen in FIG. 3, according to another preferred embodiment of the present invention, a raised rib 36 is formed having a flat engagement face 38 and a pair of opposed angled walls 40. Flat engagement face 38 includes a rib width "C" and a rib height "D". Each of the angled walls 40 is formed at a rib wall angle $\theta$ with respect to flat engagement face 38. Rib wall angle $\theta$ is nominally 90° (degrees) but can vary between approximately 5° to approximately 90°. Each raised rib 36 includes inside radii $R_1$ and outside radii $R_2$ both to stiffen raised rib 36 and to promote release of angled walls 40 from a thermoforming, or similar die used to form raised rib 36. Flat engagement face 38 provides a broader surface area upon which to deposit sealing strip 34 compared to curved rib face 32 shown in FIG. 2.

In one preferred embodiment of the present invention, sealing strip 34 is provided as an adhesive bead as known in the art. When an adhesive bead is used for sealing strip 34, a protective release liner 35 is placed over the adhesive bead, after the adhesive bead is applied, to prevent dirt or contaminants from detrimentally reducing the adhesive strength of the adhesive bead prior to installation of sound shield 10. Release liner 35 is subsequently removed prior to installation of sound shield 10 to door member 14. Release liner 35 is commonly formed of a polymeric film having a release agent, such as silicon, applied thereto to allow release liner 35 to be removed from the adhesive bead without leaving a residue on the adhesive bead or sound shield 10.

Figure 4:
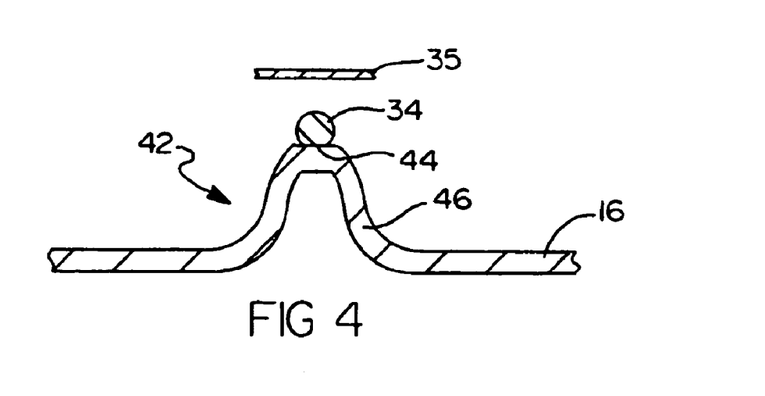
FIG. 4 is a partial cross-sectional view similar to FIG. 2 showing another alternate geometry for a raised rib of the present invention.

As best seen in FIG. 4, according to yet another preferred embodiment of the present invention, a raised rib 42 includes a narrow bead surface 44 formed at the apex of a curved wall 46. Raised rib 42 is advantageously used in areas where geometry of either trim panel 12 or door member 14 prohibits a wider engagement face such as flat engagement face 38 shown in FIG. 3.

Figure 5:
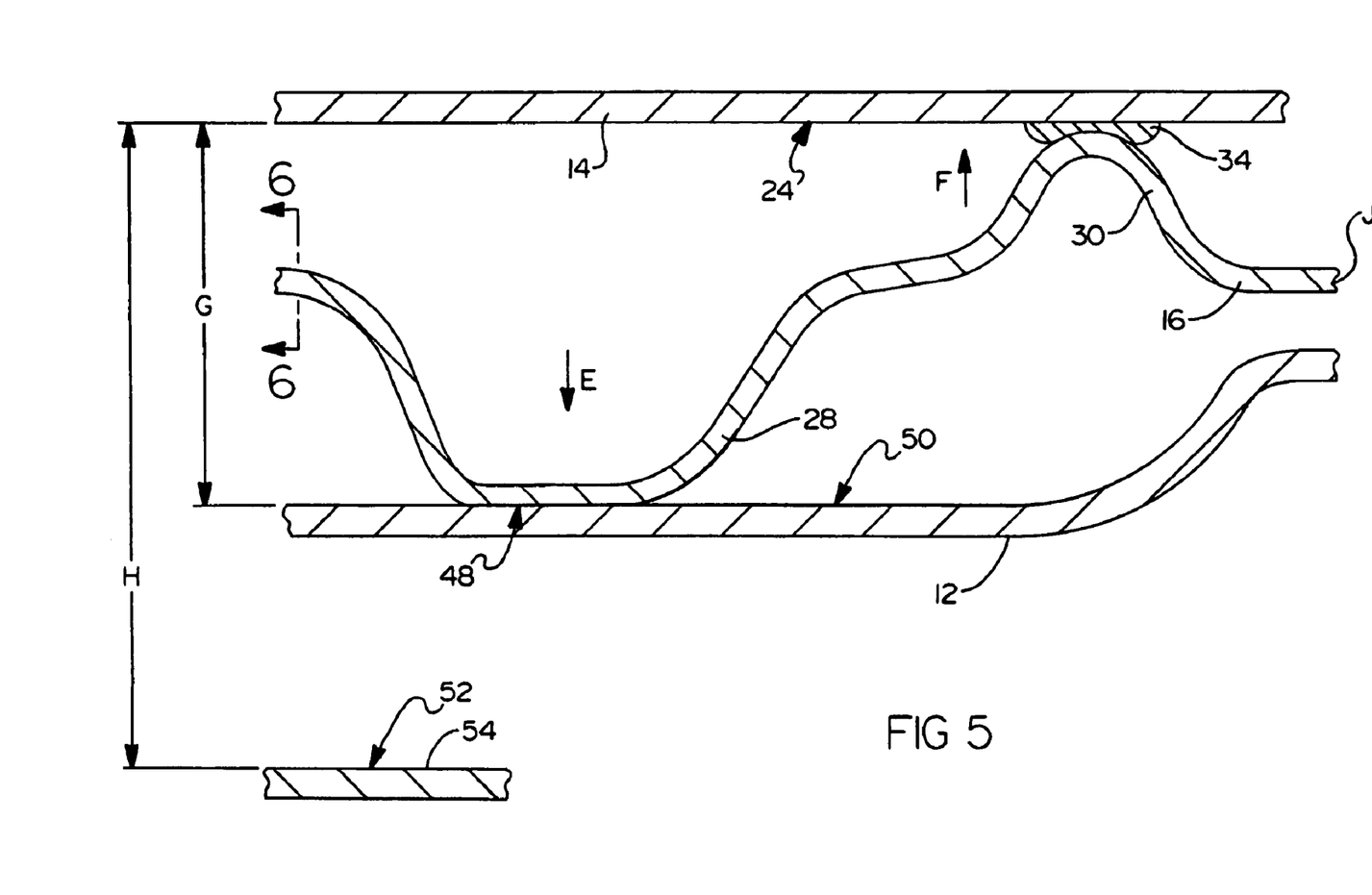
FIG. 5 is a partial cross-sectional view showing an exemplary combination of a raised rib and a raised form according to a preferred embodiment of the present invention.

Referring next to FIG. 5, in a typical installation, raised rib 30, having sealing strip 34, contacts sealing surface 24 of door member 14. In areas having intermediate zone "J" positioned between locations for fasteners 20 (shown in FIG. 2), sufficient compressive force may not be available from trim panel 12 to provide complete bonding between sealing strip 34 and sealing surface 24. The one or more raised forms 28 provide additional contact surface between a form outer face 48 of raised form 28 and a contact face 50 of trim panel 12. Raised form 28 extends outwardly in a form direction "E" which is opposed to the extending direction of raised rib 30. Trim panel 12 via raised form 28 provides additional installation force in the direction of sealing force arrow "F" to substantially equalize a bond between sealing strip 34 and sealing surface 24. Each raised form 28 therefore stiffens and extends sound shield 10 in intermediate zones "J" adjacent to raised rib 30 where fasteners 20 are not present to provide sufficient installation force.

FIG. 5 also shows an installation depth "G" which is typically available on automotive vehicles within which sound shield 10 must fit. Installation depth "G" is dictated by a cross car dimension "H" between door member 14 on a first side of a vehicle and a sealing surface 52 of an opposed door member 54. Sound shield 10 is designed to create an interference fit within installation depth "G" when compressed between a trim panel and a door member. A nominal interference fit of approximately 5 mm (0.19 in) is provided to enhance the formation of a complete seal along a length of a raised rib having a sealing strip 34.

Figure 6:
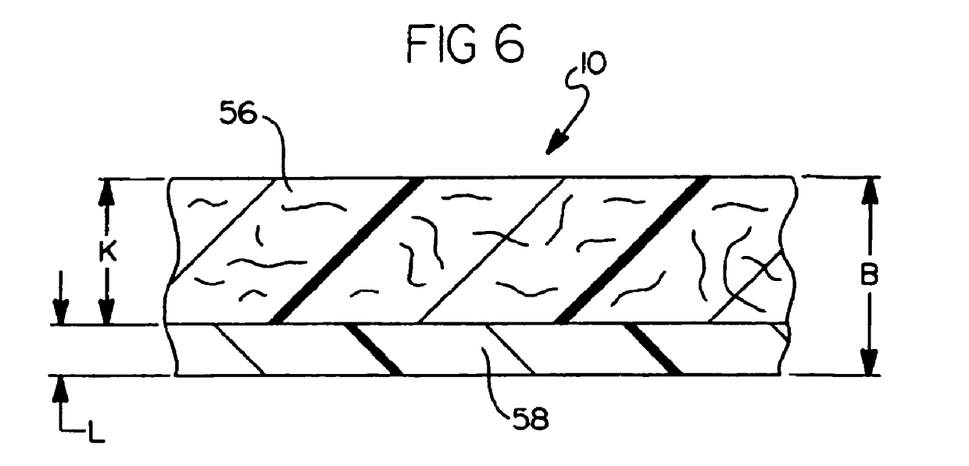
FIG. 6 is a cross-sectional view taken at Section 6—6 of FIG. 5 showing a bonded two-layer film body of a preferred embodiment of the present invention.

Referring now to FIG. 6, sound shield 10 is generally formed of two bonded layers each having at least one polymeric material. An interpolymer layer 56 is bonded to a polymeric layer 58. Interpolymer layer 56 includes at least one polymeric material having one or more inorganic materials combined therein. In a preferred embodiment of the present invention, interpolymer layer 56 is formed of Keldex® 6868, available from The DuPont Corporation. The inorganic filler is calcium carbonate and/or barium sulfate, or similar material known in the art. The inorganic filler makes up approximately 50 percent to approximately 95 percent by volume of interpolymer layer 56. Due to the inorganic fillers present in interpolymer layer 56, stretching of sound shield 10 while forming raised ribs 30 or raised forms 28 could result in unacceptable porosity within interpolymer layer 56. Polymeric layer 58 is therefore used, providing a material which is capable of approximately 1000% elongation, compared to the approximate 400% elongation provided by Keldex®. In a preferred embodiment, polymeric layer 58 is a high density polyethylene material, and an interpolymer layer thickness "K" is approximately 0.51 mm (0.020 in). Use of a high density polyethylene material for polymeric layer 58 allows polymeric layer thickness "L" to be minimized, in a preferred embodiment, to approximately 0.25 mm (0.010 in).

Referring also to FIG. 6, in another preferred embodiment of the present invention, sound shield 10 is formed from only interpolymer layer 56, if formation of raised ribs 30 and raised forms 28 (shown and described in reference to FIGS. 1 and 5), does not result in porosity in interpolymer layer 56. Polymeric layer 58 is omitted in this embodiment.

Sound shield 10 can be formed using a variety of processes. In a preferred embodiment, interpolymer layer 56 and polymeric layer 58 are coextruded using a coextrusion process known in art. The coextrusion process thermally bonds interpolymer layer 56 to polymeric layer 58. In another preferred embodiment of the present invention, polymeric layer 58 is formed separately as either a sheet or formed in a roll. In this embodiment, interpolymer layer 56 is first formed in an injection molding process, after which separately formed polymeric layer 58 is rolled with the interpolymer layer 56 to thermally bond the two layers. Following bonding of interpolymer layer 56 to polymeric layer 58, raised ribs 22 and raised forms 28 are subsequently formed using a thermoforming process known in the art.

Medium density, low density, or ultra low density polyethylene material can also be used for polymeric layer 58. Where other than high density material is used, polymeric layer thickness "L" increases accordingly to provide the same stiffness for sound shield 10 as provided by the high density polyethylene material. Total shield thickness "B" normally varies within a range of approximately 0.51 mm (0.020 in) to approximately 1.27 mm (0.050 in) depending upon the polymeric layer 58 thickness "L" and the material density required for polymeric layer 58. A maximum value for shield thickness "B" is approximately 3 mm (0.120 in). Use of a high density polyethylene material for polymeric layer 58 provides an average shield thickness "B" of approximately 0.76 mm (0.030 in). A weight basis for sound shield 10 ranges from approximately 0.15 to approximately 0.50 lb/sq-ft. Polyethylene densities are herein defined as: high density (greater than 0.940 g/cm$^3$); medium density (0.925 to 0.940 g/cm$^3$); low density (0.910 to 0.925 g/cm$^3$); and ultra low density (less than 0.910 g/cm$^3$).

Figure 7:
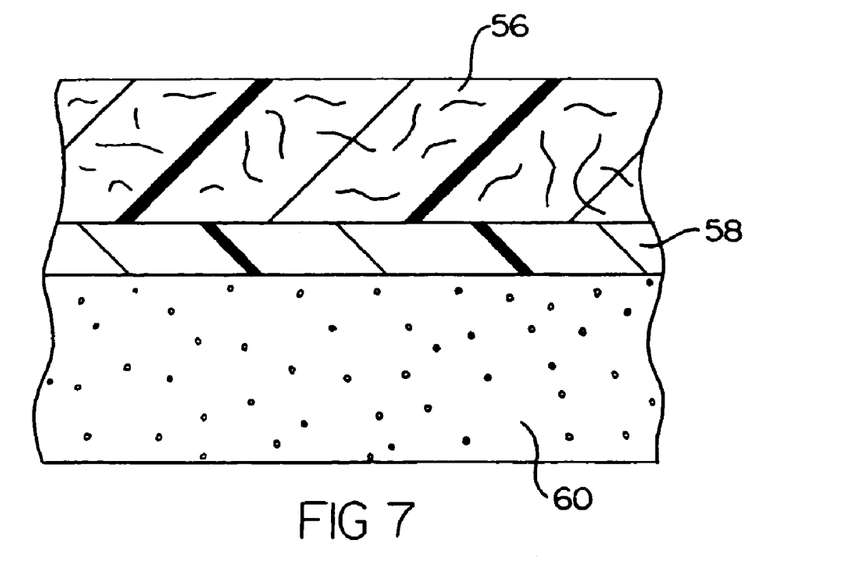
FIG. 7 is a partial cross-sectional view similar to FIG. 6 showing an additional fiber layer of another preferred embodiment of the present invention.

As best seen in FIG. 7, and according to another preferred embodiment of the present invention, a fiber layer 60 as known in the art is applied to sound shield 10. Fiber layer 60 is typically formed from a directionally stranded polymeric fiber material (for example lofted material). Fiber layer 60 can be applied to sound shield 10 using an adhesive known in the art or by thermal bonding prior to/during the thermoforming process when material temperatures are increased. Fiber layer 60 is applied in place of, or in addition to raised forms 28.

Figure 8:
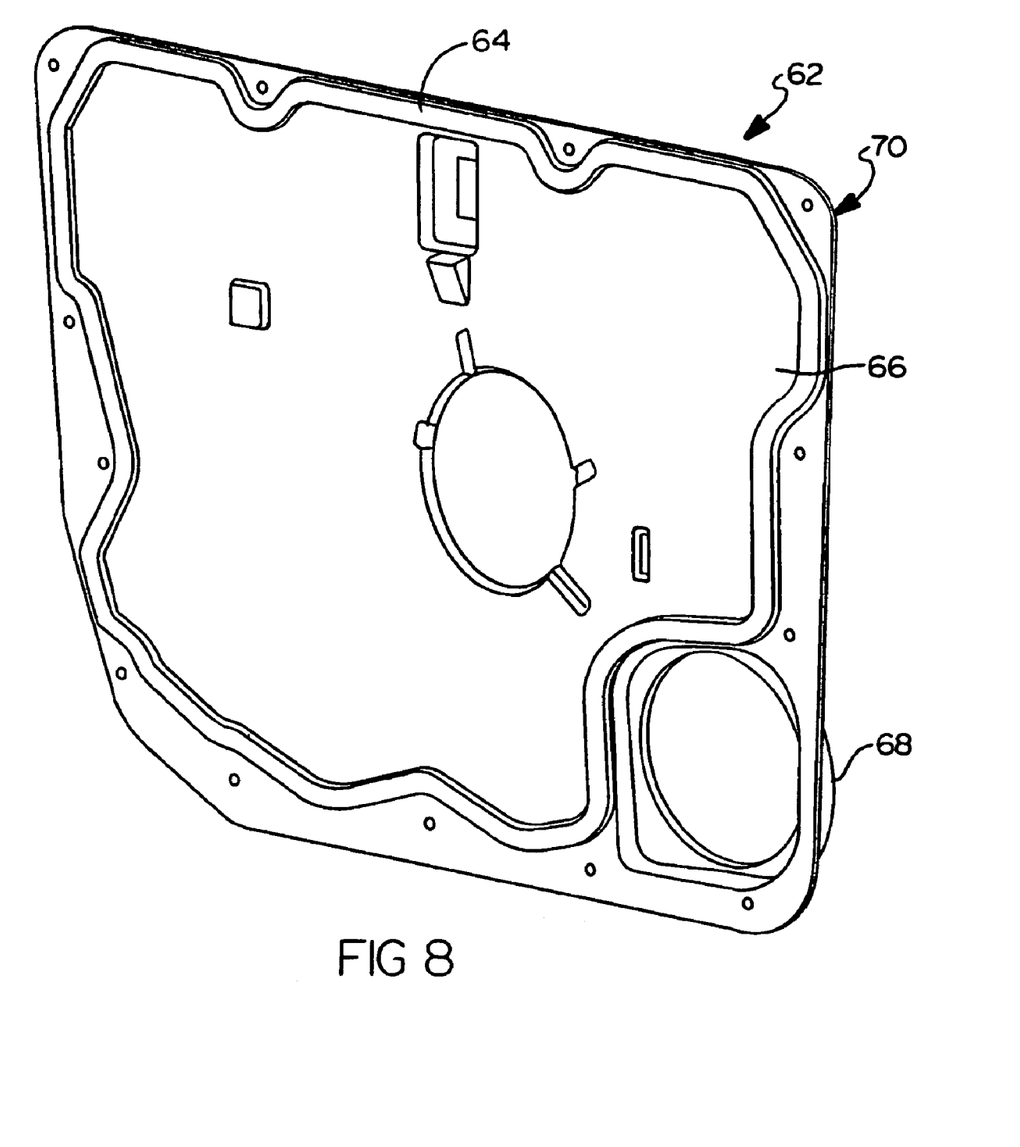
FIG. 8 is a perspective view of a shield according to another preferred embodiment of the present invention.

Referring now to FIG. 8, in another preferred embodiment of the present invention, a shield 62 includes a raised rib 64 formed circumferentially about a shield first face 66. A raised form 68 is drawn toward a shield second face 70 opposed in direction to raised rib 64. Shield 62 provides an optional configuration for raised rib 64, wherein raised rib 64 is positioned interior of raised form 68, and therefore partially spaced from the outer perimeter of shield 62.

Figure 9:
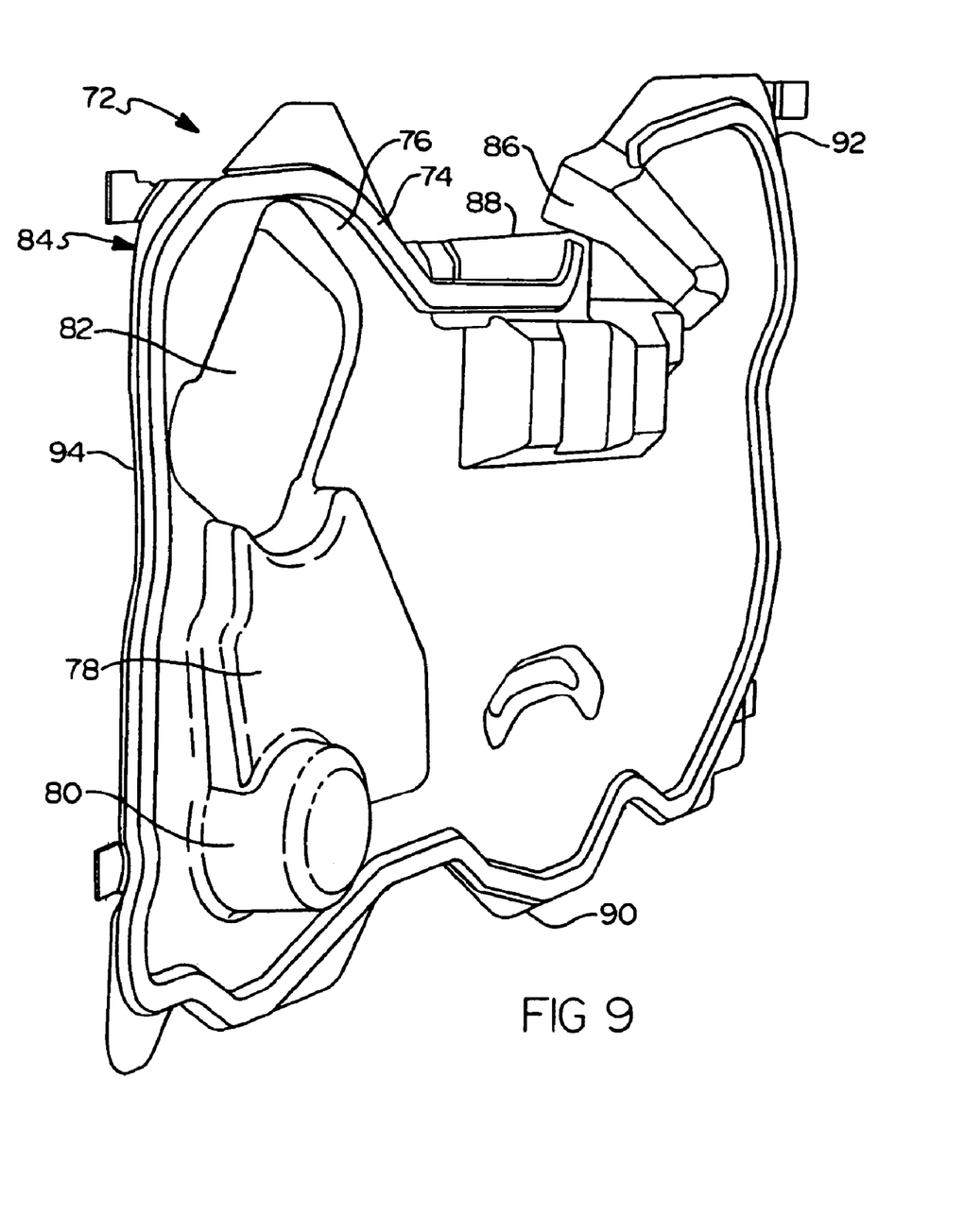
FIG. 9 is a perspective view of a yet another shield according to another preferred embodiment of the present invention.
Figure 10:
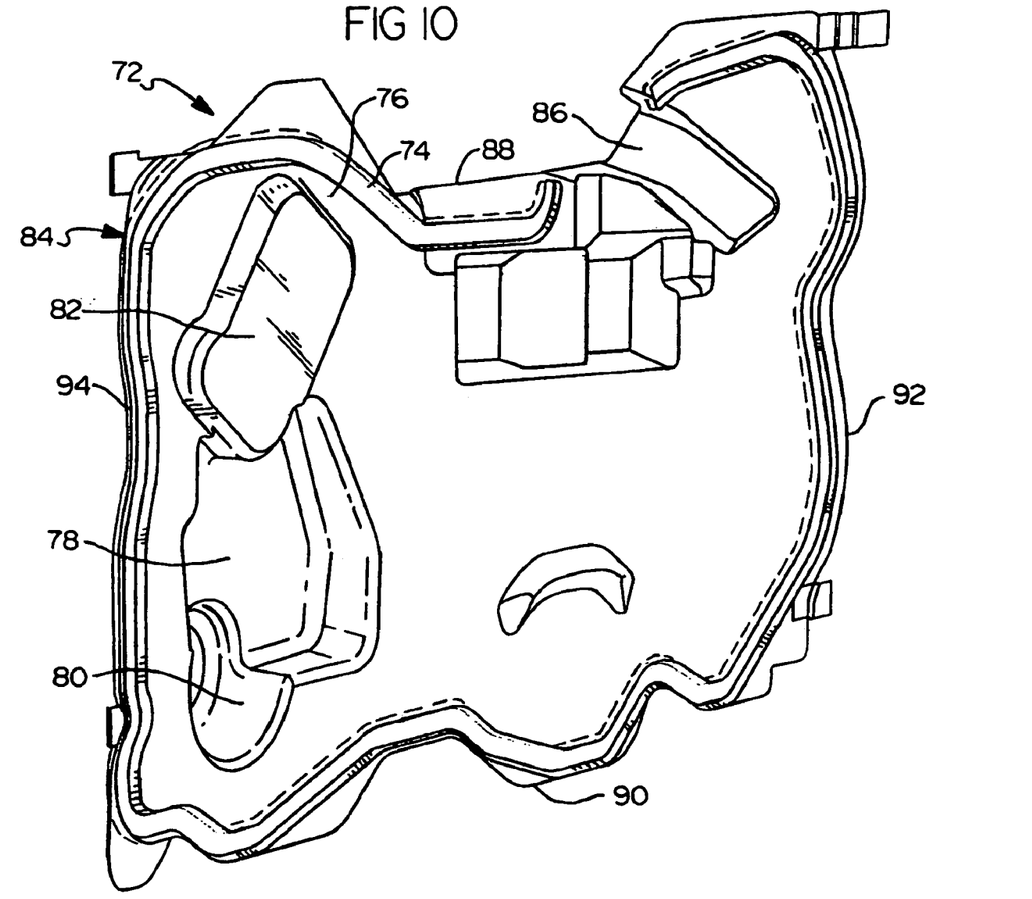
FIG. 10 is a perspective view of an opposed face of the shield of FIG. 9.

As shown in FIGS. 9 and 10, in yet another preferred embodiment of the present invention, a shield 72 includes a partial raised rib 74 which does not form a 360° degree seal about a shield first face 76. Raised rib 74 and both a first cavity form 78 and a second cavity form 80 extend outwardly from a shield first face 76. First cavity form 78 and second cavity form 80 are typical of cavity forms used to accommodate mechanical items of a door assembly. A raised form 82 extends outwardly from a shield second face 84 and oppositely extends compared to partial raised rib 74. Raised form 82 provides increased sealing force for partial raised rib 74 as previously noted herein and can also provide clearance volume for additional items extending from the door assembly. Partial raised rib 74 is intersected by a cavity form 86. Sound shields of the present invention do not require 360° raised ribs. Where a 360° raised rib is not used, it is preferable (although not required) that missing portions of the raised rib be accommodated adjacent a shield upper edge 88 rather than at a shield lower edge 90, or at either of a shield first side 92 or a shield second side 94 to minimize locations where moisture can enter the door assembly. For vehicle door installations, moisture is most commonly present at shield lower edge 90, shield first side 92 or shield second side 94.

Figure 11:
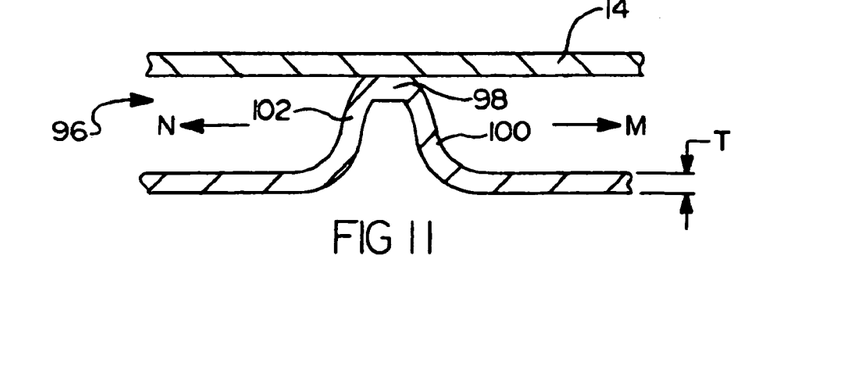
FIG. 11 is a partial cross sectional view similar to FIG. 4, showing a raised rib design according to still another preferred embodiment of the present invention which is operable to form a seal without an adhesive bead.

As best seen in FIG. 11, another preferred embodiment is shown for forming the raised rib(s). A raised rib 96 includes a narrow engagement surface 98 formed at the apex of opposed walls 100, 102. In this embodiment, a sealing strip is not used to seal engagement surface 98 to door member 14. Engagement surface 98 directly contacts door member 14. Raised rib 96, similar to raised ribs 22, 30, 36 and 42, is formed over a mandrel, known in the art as "male forming", together with any raised form 28 directed to the same side of body 16 as raised rib 96, while the remaining body 16 of sound shield 10 is thermoformed. By male forming raised rib 96, a uniform wall thickness "T" of body 16 and raised rib 96 are maintained. This ensures that engagement surface 98 does not deflect upon contacting door member 14. Instead of engagement surface 98 deflecting upon contact with door member 14, each of the opposed walls 100, 102 deflect outwardly, in the direction of arrows M and N, respectively. A nominal interference of approximately 5 mm between raised rib 96 and door member 14 is accommodated by this outward bowing of opposed walls 100 and 102. Raised rib 96 further eliminates the need for an sealing strip by the narrow engagement surface 98 geometry.

Figure 12:
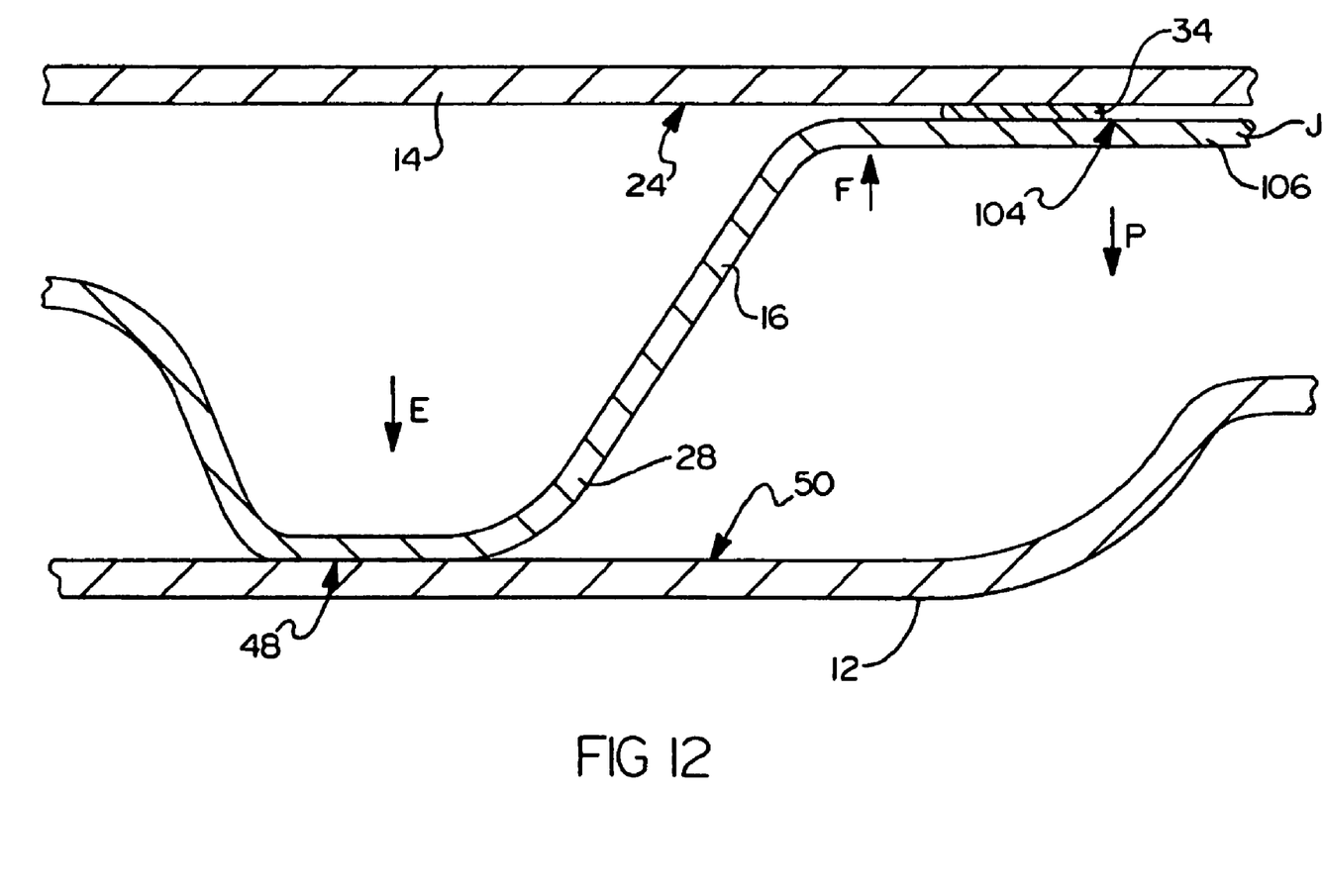
FIG. 12 is a partial cross-sectional view, similar to FIG. 5, showing an exemplary combination of a raised form and a flattened sealing area according to another preferred embodiment of the present invention.

Referring to FIG. 12, in another preferred embodiment of the present invention, raised rib 30 (shown and described in reference to FIG. 5) is eliminated, and replaced by a flat sealing surface 104 on an outer perimeter region 106 of body 16. In this embodiment, sealing strip 34, as either an adhesive bead or a gasket, is positioned about the perimeter of sound shield 10 on flat sealing area 104. Raised form 28 is retained in this embodiment to stiffen sound shield 10 in intermediate zones "J" adjacent to sealing strip 34 where fasteners 20 are not present to provide sufficient installation force. A nominal 5 mm design interference is provided between sealing surface 24 of door member 14 and outer perimeter region 106. Outer perimeter region 106 deflects in the direction of arrow P when raised form 28 urges outer perimeter region 106 and sealing strip 34 into contact with door member 14 to accommodate this interference.

Figure 13:
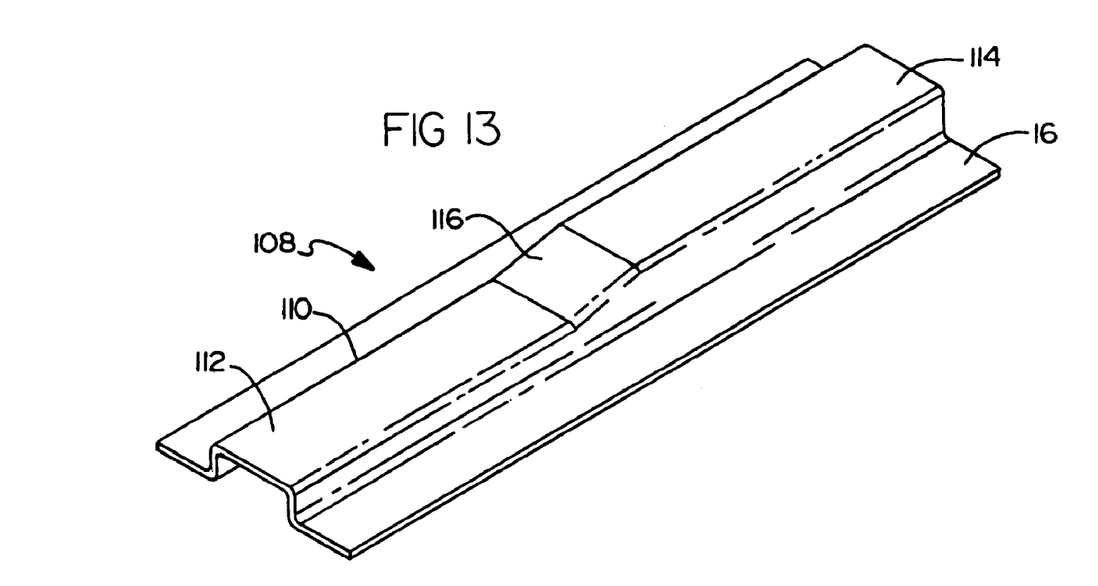
FIG. 13 is a perspective view of another preferred embodiment of a raised rib of the present invention.
Figure 14:
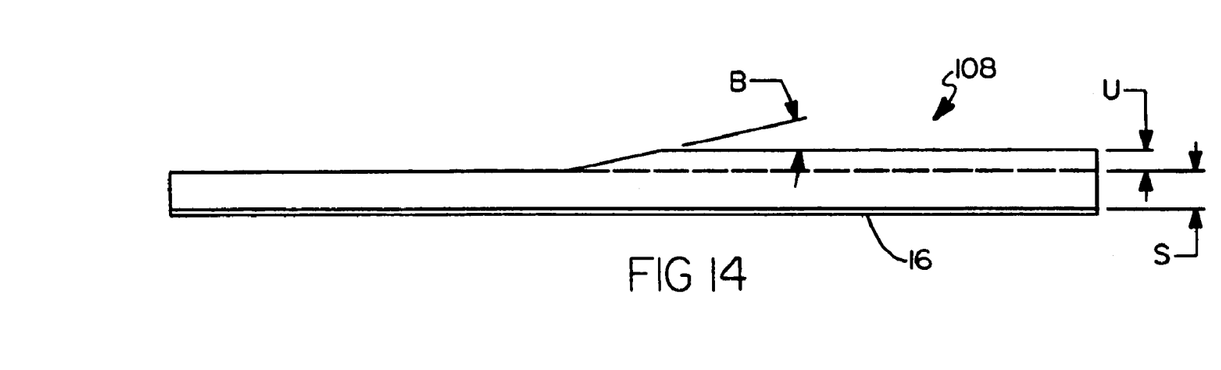
FIG. 14 is a side elevational view of the raised rib of FIG. 13.

Referring next to FIGS. 13 and 14, in another preferred embodiment, a raised rib 108 includes a generally rectangular-shaped body 110 having a first elevated section 112 and a second elevated section 114, elevated above first elevated section 112. A transition region 116 joins first elevated section 112 to second elevated section 114. Transition region forms an angle $\beta$ to body 16. Angle $\beta$ can vary between approximately 20 degrees to approximately 90 degrees. First elevated section 112 is raised to a height S above body 16. Second elevated section 114 is raised to a height U above body 16. The purpose for second elevated section 114 is to permit sound shield 10 to accommodate the condition when a portion of sealing surface 24 of door member 14 extends away from a plane formed by body 16 of sound shield 10 such that a raised rib, such as raised rib 22 (shown in FIG. 1) cannot make physical contact with sealing surface 24. For this design condition, raised rib 108, having second elevated section 114, is provided to contact sealing surface 24 in those portions extending away from first elevated section 112. Height U and angle $\beta$ are adjustable when forming raised rib 108. Height U is extendable up to approximately 5 mm greater than height S for this purpose. One or more sections of second elevated section 114 can be provided along an individual raised rib 108.

In addition to Keldex® material described herein, material for the interpolymer layer 56 of the present invention can also be formed using polypropylene (PPR), thermoplastic elastomer (TPE), polyvinyl chloride (PVC), or other polymeric materials having mineral filler with thermoplastic material. In addition, foamed polymeric material with non-cross linking type concentrates can be substituted to increase stiffness and/or rigidity, plus reduce weight if weight reduction is desirable. Still further, approximately 1% to approximately 3% polymeric glass fiber fill can be added to the interpolymer layer of the present invention to further increase density and increase acoustic attenuation. Alternate materials in addition to polyethylene can also be used for the polymeric layer of the present invention. These include any polymeric material offering greater than 400% elongation, and preferably approximately 1000% elongation, with a density and a stiffness similar to polyethylene material. Material for sealing strip 34 includes any commercially available adhesive such as hot melt adhesives, or a deformable, water impermeable material suitable to act as a gasket.

Sound and water shields of the present invention provide several advantages. By combining an interpolymer material layer with a high density polymeric material layer a shield can be formed of entirely molded material compared to shields having a molded material layer plus a fiber layer known in the art. Shield acoustic attenuation and moisture resistance are maintained or improved in a shield which is formed using one or more molding and thermoforming steps. A separate layer of fiber, known in the art, can be applied but is not required for shields of the present invention. The use of a polyethylene layer in a sound shield of the present invention provides increased material elongation, which enhances formation of one or more raised ribs adjacent a perimeter of the shield. Raised ribs stiffen the sound shield and improve a seal formed to a vehicle body member compared to a seal formed from only an adhesive bead alone. The use of raised forms adjacent to the raised ribs equalizes a sealing pressure along an entire length of the raised rib.

A sound shield 10 of the present invention can be connected to either the vehicle door (using an adhesive as the sealing strip for contact support) or the trim panel (using fasteners described herein). In addition to co-extrusion, a sound shield 10 of the present invention can be injection molded to exact dimensional requirements. This is beneficial for large volume production runs, where a normally higher injection molding tooling cost can be accommodated.

Water and sound shields of the present invention are described herein in reference to shields disposed in door assemblies of automotive vehicles. Water and sound shields of the present invention are not intended to be limited to these applications. Other applications include, but are not limited to, rear view mirror gaskets and isolation panels for front or rear quarter panels.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A polymeric material vehicle barrier having at least one raised element, comprising:
 a barrier film having at least one layer including an interpolymer material;
 at least one rib defining the raised element extending outwardly from a first face of the barrier film, the rib operably positioned proximate an outer perimeter of the film, the rib including:
  a substantially non-deflectable flat engagement surface;
  a pair of opposed walls each connected between the engagement surface and the barrier film; and
  a width of the engagement surface selectable to ensure each of the opposed walls deflects outwardly with no substantial deflection of the engagement surface when the engagement surface contacts a vehicle surface; and
 at least one drawn form positioned proximate the at least one rib and extending outwardly from a second face of the barrier film, the second face directed opposite to the first face;
 wherein the width of the engagement surface of the rib defines a seal without the use of a sealing material between the engagement surface and a first body member of a vehicle, the drawn form operably enhancing formation of the seal.

2. The polymeric material barrier of claim 1, wherein the barrier film comprises a first layer having the interpolymer material and a second layer.

3. The polymeric material barrier of claim 2, wherein the second layer comprises a polymeric material.

4. The polymeric material barrier of claim 3, wherein the polymeric material comprises a polyethylene material.

5. The polymeric material barrier of claim 1, wherein the drawn form is in operable contact with a second body member of the vehicle to maintain a sealing force along the seal formed by the rib.

6. The polymeric material barrier of claim 1, wherein the rib comprises a male formed rib having a substantially uniform wall thickness throughout the rib.

7. The polymeric material barrier of claim 1, wherein the rib further comprises:
   a generally rectangularly shaped body including:
      a first substantially flat section elevated from the barrier film; and
      a second substantially flat section elevated above the first elevated section with respect to the barrier film.

8. A polymeric material vehicle barrier having at least one raised element, comprising:
   a barrier film having a first layer and a polymeric second layer, the first layer including an interpolymer material;
   at least one rib defining the raised element and a raised seal, the rib operably positioned adjacent an outer perimeter of the film, the rib including:
      a substantially non-deflectable flat engagement surface;
      a pair of opposed walls each connected between the engagement surface and the barrier film; and
      a width of the engagement surface selectable to ensure each of the opposed walls deflects outwardly with no deflection of the engagement surface when the engagement surface contacts a body member of a vehicle; and
   at least one drawn form positioned proximate the at least one rib operable to maintain a substantially consistent sealing force along the raised seal;
   wherein the interpolymer material includes a density selectable to attenuate an acoustic energy through the film when the rib is in operable communication with the body member of the vehicle.

9. The polymeric material barrier of claim 8, comprising a film volume wherein the first layer defines approximately sixty five percent of the film volume.

10. The polymeric material barrier of claim 8, comprising a film volume wherein the first layer defines a percentage of the film volume ranging from approximately twenty percent to approximately ninety five percent.

11. The polymeric material barrier of claim 8, wherein the density of the interpolymer material is at least 2.0 g/cm$^3$.

12. The polymeric material barrier of claim 8, wherein the interpolymer material comprises a filler having at least one of a calcium carbonate material and a barium sulfate material.

13. The polymeric material barrier of claim 8, comprising:
   a film thickness ranging from approximately 0.25 mm to approximately 1.52 mm; and
   a film weight basis ranging from approximately 0.15 to approximately 0.50 lb/sq-ft.

14. The polymeric material barrier of claim 8, comprising a nominal film thickness of approximately 0.76 mm.

15. The polymeric material barrier of claim 8, wherein the second layer comprises a polyethylene material.

16. The polymeric material barrier of claim 8, comprising an outward facing surface of the rib operably formed by the second layer.

17. A polymeric material vehicle barrier having at least one raised element, the barrier comprising:
   a composite sheet having a plurality of apertures defining fastener attachment points operable to connect the barrier to a vehicle trim piece;
   a first sheet layer including an interpolymer material;
   a second sheet layer including a polyethylene material; and
   a raised rib defining the raised element formed about at least a portion of a perimeter of the composite sheet, the raised rib operable to form a seal between the composite sheet and a vehicle body member, the raised rib including:
      a substantially non-deflectable flat engagement surface;
      a pair of opposed walls each connected between the engagement surface and the barrier film; and
      a width of the engagement surface selectable to ensure each of the opposed walls deflects outwardly with no deflection of the engagement surface when the engagement surface contacts the vehicle body member;
   wherein the barrier operably attenuates an acoustic energy between the vehicle trim piece and the vehicle body member.

18. The polymeric material barrier of claim 17, wherein the interpolymer material comprises a thermoplastic elastomer substantially filled with from approximately 50 percent to approximately 95 percent of an inorganic filler.

19. The polymeric material barrier of claim 17, wherein the polyethylene material comprises one of a high density polyethylene, a medium density polyethylene, a low density polyethylene, and an ultra low density polyethylene.

20. The polymeric material barrier of claim 17, comprising at least one molded form positionable between the vehicle body member and the vehicle trim piece operable to substantially equalize a sealing force along a length of the raised rib.

* * * * *